A. L. HILL.
FISHING HOOK.
APPLICATION FILED JUNE 19, 1917.

1,239,487.

Patented Sept. 11, 1917.

Arthur L. Hill
Inventor

By Geo. Kimmel
Attorney

UNITED STATES PATENT OFFICE.

ARTHUR LEE HILL, OF FAXON, OKLAHOMA.

FISHING-HOOK.

1,239,487.　　　　Specification of Letters Patent.　　Patented Sept. 11, 1917.

Application filed June 19, 1917. Serial No. 175,639.

*To all whom it may concern:*

Be it known that I, ARTHUR LEE HILL, a citizen of the United States, and resident of Faxon, in the county of Comanche and State of Oklahoma, have invented certain new and useful Improvements in Fishing-Hooks, of which the following is a specification.

This invention relates to new and useful improvements in fishing hooks, and the primary object of the invention is to provide a device of this character, it is provided with a plurality of collapsible gripping hooks, normally held in extended position, and adapted to swing inwardly to securely grasp a fish, when the same is hooked by the bait carrying hook, to prevent the fish from escaping therefrom.

Another object of the invention is to provide a device of this character that is collapsed when not in operation, so as to occupy a very small space, but which will automatically swing outwardly to operative position when the same is dropped in the water.

A still further object of the invention is to provide a device of this character which is easily and simply constructed, inexpensive to manufacture, and one which will be very efficient in operation.

With these and numerous other objects in view, my invention consists of the novel features of construction, combination and arrangement of parts which will be herein referred to and more particularly pointed out in the specification and claims.

In the accompanying drawings.

In describing my invention I shall refer to the drawings in which similar reference characters designate corresponding parts throughout the several views.

Figure 1:
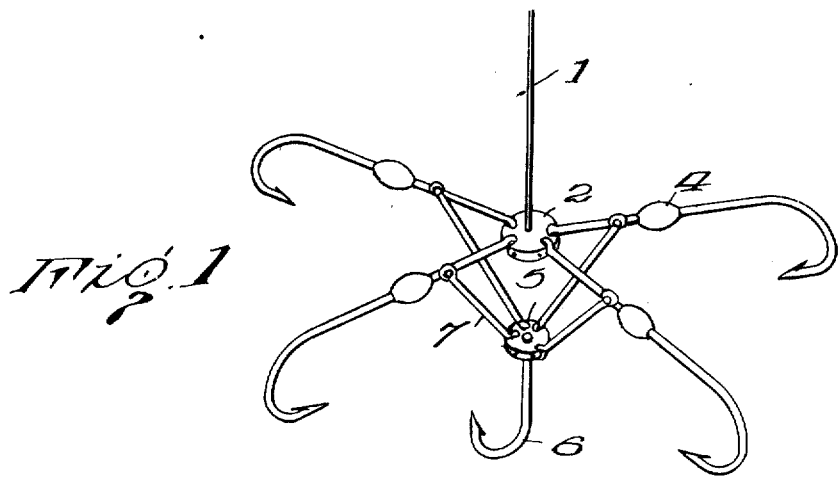
Figure 1 is a perspective view of the device in open position.
Figure 2:
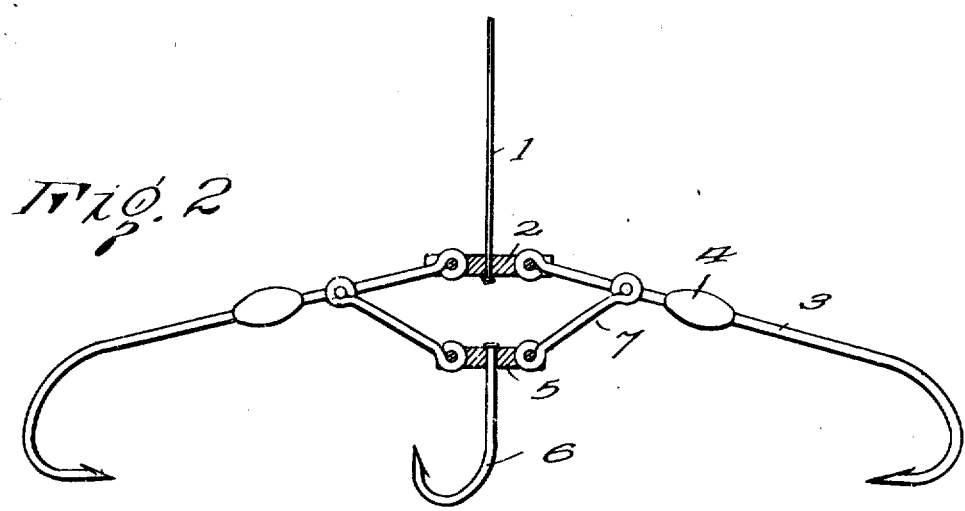
Fig. 2 is a vertical section of the same.

The numeral 1 designates the lower end of the fishing line, which is secured to a disk 2, said disk having pivotally connected therewith a plurality of radially projecting gripping hooks 3, that are provided with floats 4 intermediate the ends of the same, to normally hold the hooks extended when the device is in operation. Positioned directly beneath the disk 2 is a supplemental disk 5, which is movable to and from the same, and which has secured thereto a bait carrying hook 6 of the conventional type. The movable disk 5 has a plurality of connecting links 7, which connect the peripheral edge of the same with the gripping hooks 3, intermediate the ends of said gripping hooks.

In operation it is obvious that the novel arrangement of the collapsible hooks 3 will be disposed together, but as soon as the device is dropped into the water, the floats 4 will swing said hooks outwardly, and the device will assume the position shown clearly in Fig. 1 of the drawing. Upon a fish being caught on the hook 6, the disk 5 will be moved downwardly or outwardly from the disk 2, and owing to the fact that said disk is connected with the gripping hooks 3 to the medium of the connecting links 7, said gripping hooks will be collapsed and will swing inwardly to securely grip the fish, and prevent the same from escaping from the hook.

Owing to the fact that the gripping hooks 3 are collapsible, this device will occupy a very small amount of space when they are not in operation. The floats that are carried by the collapsible gripping hooks 3 will cause the same to swing to open position, as soon as the device is dropped into the water.

From the above description taken in connection with the accompanying drawings, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

Having fully described my invention, what I claim as new, and desire to secure by Letters Patent, is:—

1. A device of the class described including a plurality of collapsible gripping hooks, a float carried by each of said hooks to normally hold them extended when the device is in operation, and a centrally disposed movable bait carrying hook connected with said gripping hooks and adapted to collapse the same upon outward movement.

2. A device of the class described including a pair of superposed disks, a plurality of gripping hooks pivotally connected with the upper disk, a float carried by each of said hooks to normally hold the same extended when the device is in operation, a bait carrying hook on the lower disk, and links connecting the lower disk with the gripping hooks to collapse said gripping hooks upon outward movement of said bait holding hook.

In testimony whereof, I affix my signature hereto.

Mr. ARTHUR LEE HILL.